(No Model.) 2 Sheets—Sheet 2.
J. ELLIS.
HORSE POWER.
No. 259,834. Patented June 20, 1882.
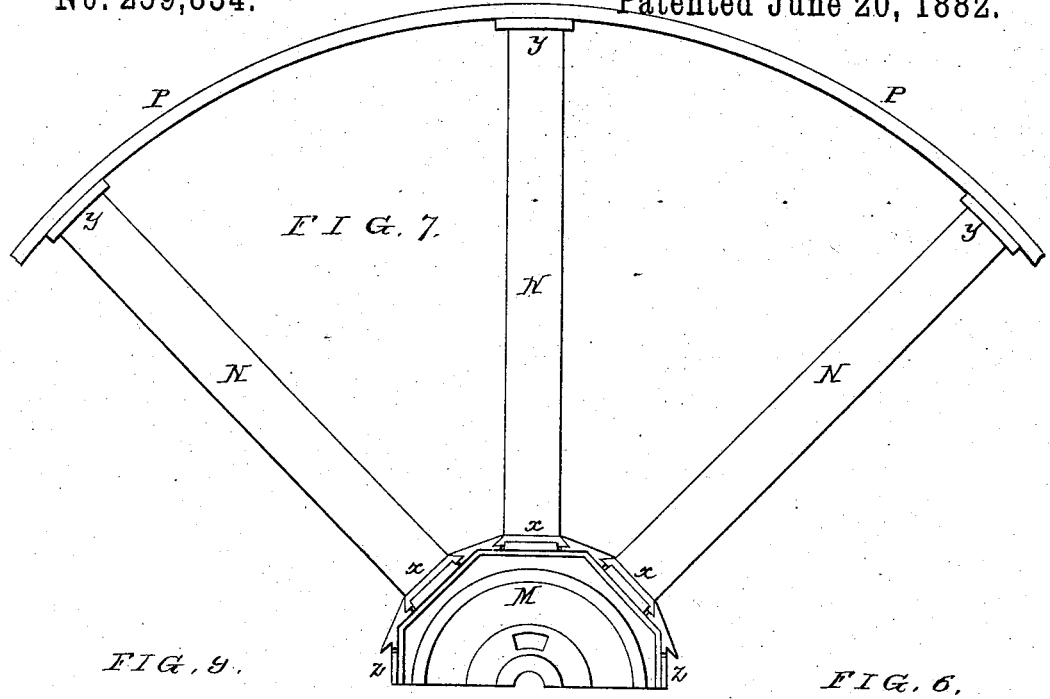
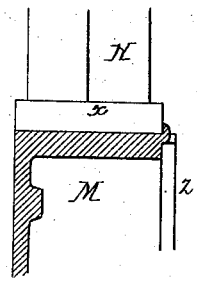
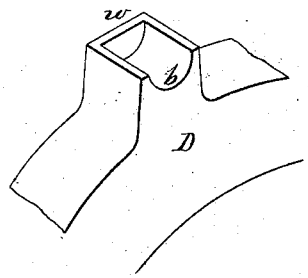
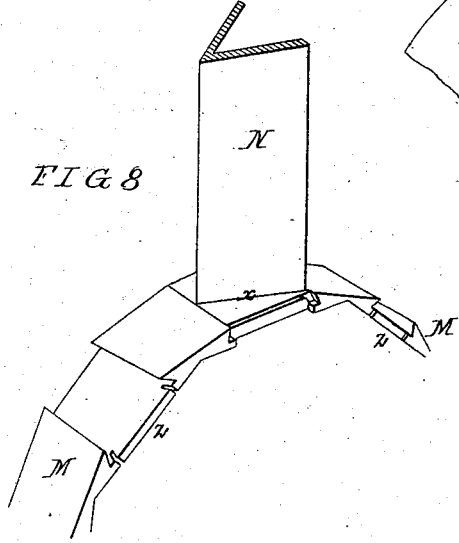
WITNESSES:
Harry Drury
James F. Tobin
INVENTOR:
John Ellis
by his attorneys.
Howson and Son

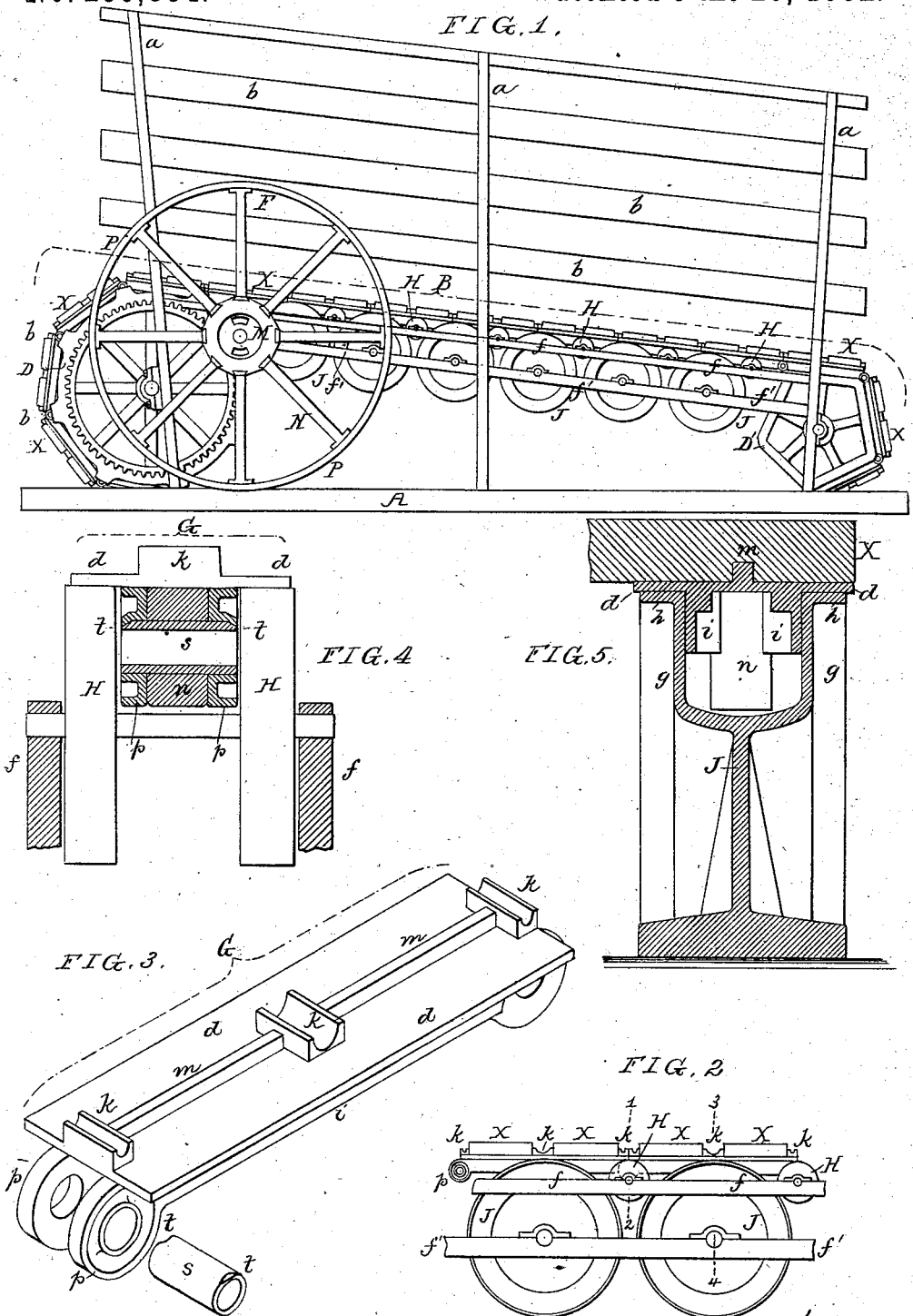

UNITED STATES PATENT OFFICE.

JOHN ELLIS, OF POTTSTOWN, PENNSYLVANIA, ASSIGNOR TO IDA K. B. ELLIS, OF SAME PLACE.

HORSE-POWER.

SPECIFICATION forming part of Letters Patent No. 259,834, dated June 20, 1882.

Application filed April 24, 1882. (No model.)

*To all whom it may concern:*

Be it known that I, JOHN ELLIS, a citizen of the United States, and a resident of Pottstown, Montgomery county, Pennsylvania, have invented certain Improvements in Horse-Powers, of which the following is a specification.

My improvements relate to the construction of the endless chain, sprocket-wheels, and chain supporting devices, and also to the flywheel, the character of the improvements being too fully described hereinafter to need any specific mention in this portion of the specification.

In the accompanying drawings, Figure 1 is a side view of a horse-power machine with my improvements; Fig. 2, a side view, on a larger scale, of part of the same; Fig. 3, a perspective view of one of the links and connecting-pins of the endless chain; Figs. 4 and 5, enlarged transverse sections on the lines 1 2 and 3 4, respectively, Fig. 2; Fig. 6, Sheet 2, a view of part of one of the chain or sprocket wheels; and Figs. 7, 8, and 9, views of part of the flywheel.

The frame of the machine comprises, as usual, a base, A, with vertical posts $a$ and slats $b$, forming a stall, the bottom of which is formed by the endless tread B, the latter comprising, as usual, transverse strips or lags X, carried by a pair of endless chains which pass around wheels D D', adapted to bearings on the end posts, $a$, of the frame, the said wheels D D' having sprockets $b$ for the reception of the joints between the links of the chains, and the wheel D having spur-teeth which gear into the teeth of a pinion on the fly-wheel shaft, the fly-wheel being clutched to said shaft by means which it has not been deemed necessary to show in the drawings, as they form no part of my present invention.

Each link G of the endless chains consists of a plate, $d$, with longitudinal flanges $i$ on the under side. Those portions of the plate $d$ which project laterally beyond the flanges $i$ bear upon and are supported by wheels H and J, the shafts of the wheels H being carried by bars $f$ and the shafts of the wheels J by bars $f'$ of the frame of the machine.

The wheels H are arranged in pairs on opposite sides of the flanges $i$, but the wheels J are single and have deeply-grooved or U-shaped rims $g$, with flanges $h$, the grooved rims receiving the flanges $i$ and the joints between the links, and the annular flanges $h$ forming a bearing for the laterally-projecting portions of the plates $d$ of said links.

The ribs $i$ serve, in connection with the wheels H and J, to prevent any lateral movement of the links, so that the chain is not only firmly supported at all points, but is compelled to travel in a straight line, and to remain properly in gear with the sprocket-wheels D D'.

In the absence of the wheels H there might be a tendency of the joints of the links to sag between the points of support afforded by the flanges of the wheels J; but the presence of the wheels H at points midway between the wheels J counteracts this objection.

The upper surface of each link has short transverse lugs $k$, one at each end of the link and one in the center, and between these lugs extend central longitudinal ribs, $m$, which are adapted to saw-kerfs or grooves formed in the under side of the transverse strips or lags X of wood, which are carried by the links, extend from one endless chain to the other, and form the tread of the machine, these strips being bolted to the links, and the retaining duty of the bolts being supplemented by the lugs $k$, which bear upon the edges of the strips, and by the ribs $m$, which are adapted to the saw-kerfs or grooves therein, as shown in Fig. 5.

Each link has at one end a central lug, $n$, and at the opposite end two lugs, $p\ p$, the lug $n$ at one end of one link being adapted to fit between the lugs $p\ p$ on an adjoining link, and all of the lugs having central openings for the reception of the connecting-pin $s$, which in the present instance is tubular, and is prevented from turning and from slipping laterally out of place by forming in each end of the pin a beveled recess, $t$, and hammering down portions of the lugs $p\ p$ into said recesses, as shown in Fig. 4. When the pin becomes worn on the front side said pin may be forced out laterally, reinserted, turned partly around, so as to present a new bearing-surface, and secured in position as before.

Each of the sprockets $b$ on the wheels D D' is closed at the outer end by a guard, $w$, whereby any lateral movement of the links on the sprocket-wheels, such as would tend to cause disengagement of the two, is effectually prevented.

The fly-wheel is peculiarly constructed with the view of making the same light and strong, and to facilitate casting. The wheel comprises a hub, M, spokes N, and a rim or tire, P, the hub M having formed in its periphery beveled recesses with undercut edges, to which are adapted beveled plates $x$ on the inner ends of the spokes N, the outer end of each spoke having a plate, $y$, for being bolted to the rim, which may consist of a continuous ring, or may be made in sections, as preferred. Each spoke N is V-shaped in cross-section, so as to facilitate casting and obtain great strength with but little weight.

The hub M comprises simply a side plate and an annular flange, and the edge of this flange is reduced in thickness, so as to form a rib, $z$. The hub is made of malleable iron or other ductile metal, and portions of the rib $z$ are turned up against the ends of the plates $x$ of the spokes in order to keep said spokes in proper lateral position, slots being formed in the rib at intervals in order to facilitate this turning up of portions of said rib. (See Figs. 8 and 9.)

I claim as my invention—

1. The combination of the chain, the links of which have plates $d$, with the supporting-wheels J, having grooved or U-shaped rims with flanges $h$, as set forth.

2. The combination of the chain, the links of which have plates $d$, with the supporting-wheels J, having grooved rims, and the intermediate supporting-wheels, H, as set forth.

3. The combination of the chain having links with plates $d$ and ribs $i$, and the wheels adapted to support the plates $d$ and form lateral guides for the ribs $i$, as set forth.

4. The combination of the links having interlocking lugs $p$ and $n$ with the connecting-pins having recesses $t$, as set forth.

5. The combination of the links having lugs $k$ with the transverse lags or strips X, bearing against said lugs $k$, as set forth.

6. The combination of the transverse lags or strips X, having recesses in the under side, with the links having ribs $m$, adapted to said recesses, as set forth.

7. The combination of the endless chain with the sprocket-wheels having sprockets $b$, with guard-plates $w$ on the outside, as set forth.

8. The fly-wheel having hollow spokes of V-shaped cross-section, as specified.

9. The combination, in a fly-wheel, of the hub M, having tapered and undercut recesses, the spokes N, having plates $x$, adapted to said recesses, and plates $y$ at the outer ends, and the rim P, bolted to said plates $y$, as set forth.

10. The combination of the hub M, having tapered recesses and a rib, $z$, and the spokes N, having plates $x$, adapted to said recesses, and held in place therein by upturned portions of the rib $z$, as set forth.

In testimony whereof I have signed my name to this specification in the presence of two subscribing witnesses.

JOHN ELLIS.

Witnesses:
HARRY DRURY,
HARRY SMITH.